Figure 1:
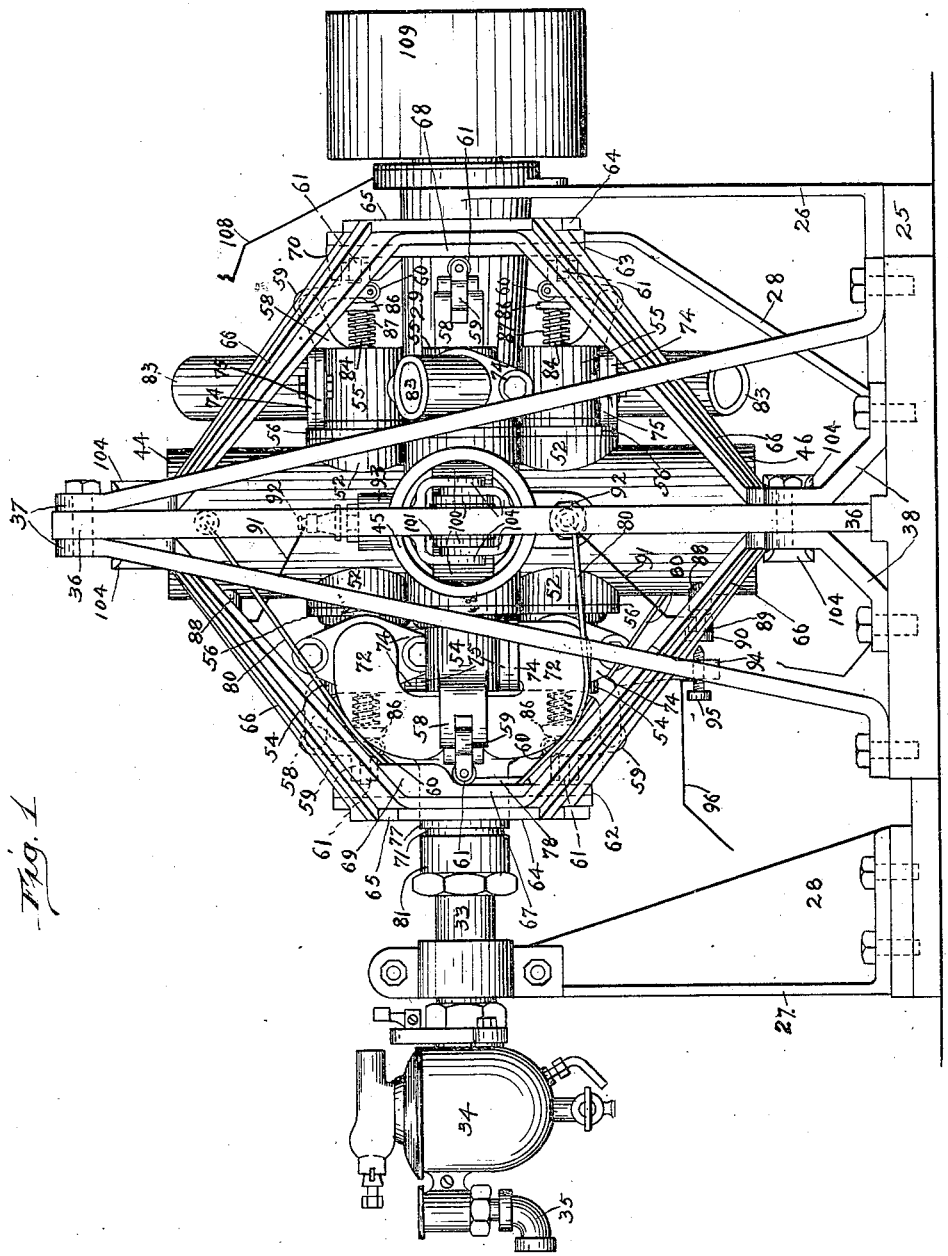

D. H. REIMERS.
CRANKLESS ENGINE OR MOTOR.
APPLICATION FILED DEC. 7, 1907.

936,036.

Patented Oct. 5, 1909.
6 SHEETS—SHEET 1.

Witnesses
Inventor
Dycke H. Reimers
by Chas C. Tillman atty

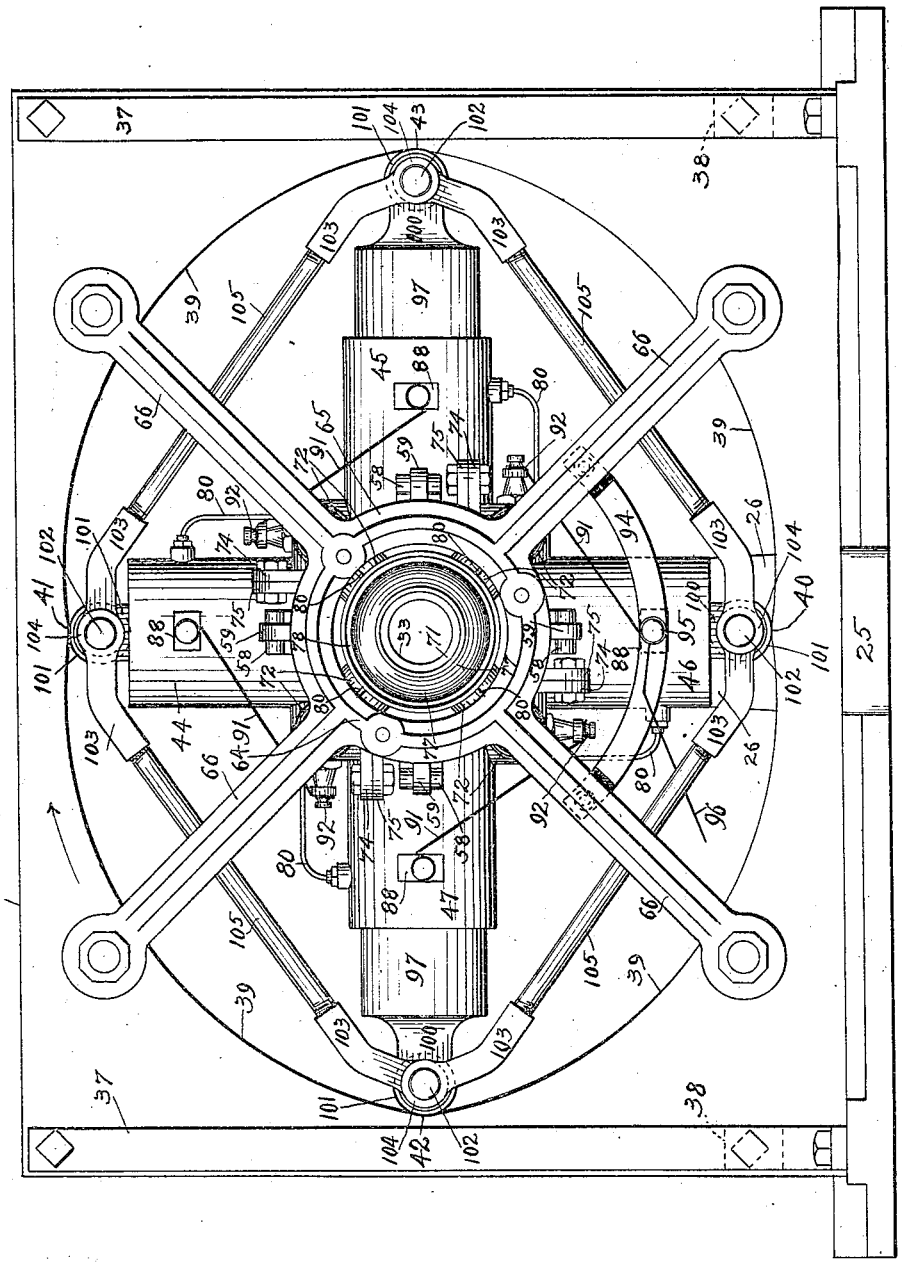

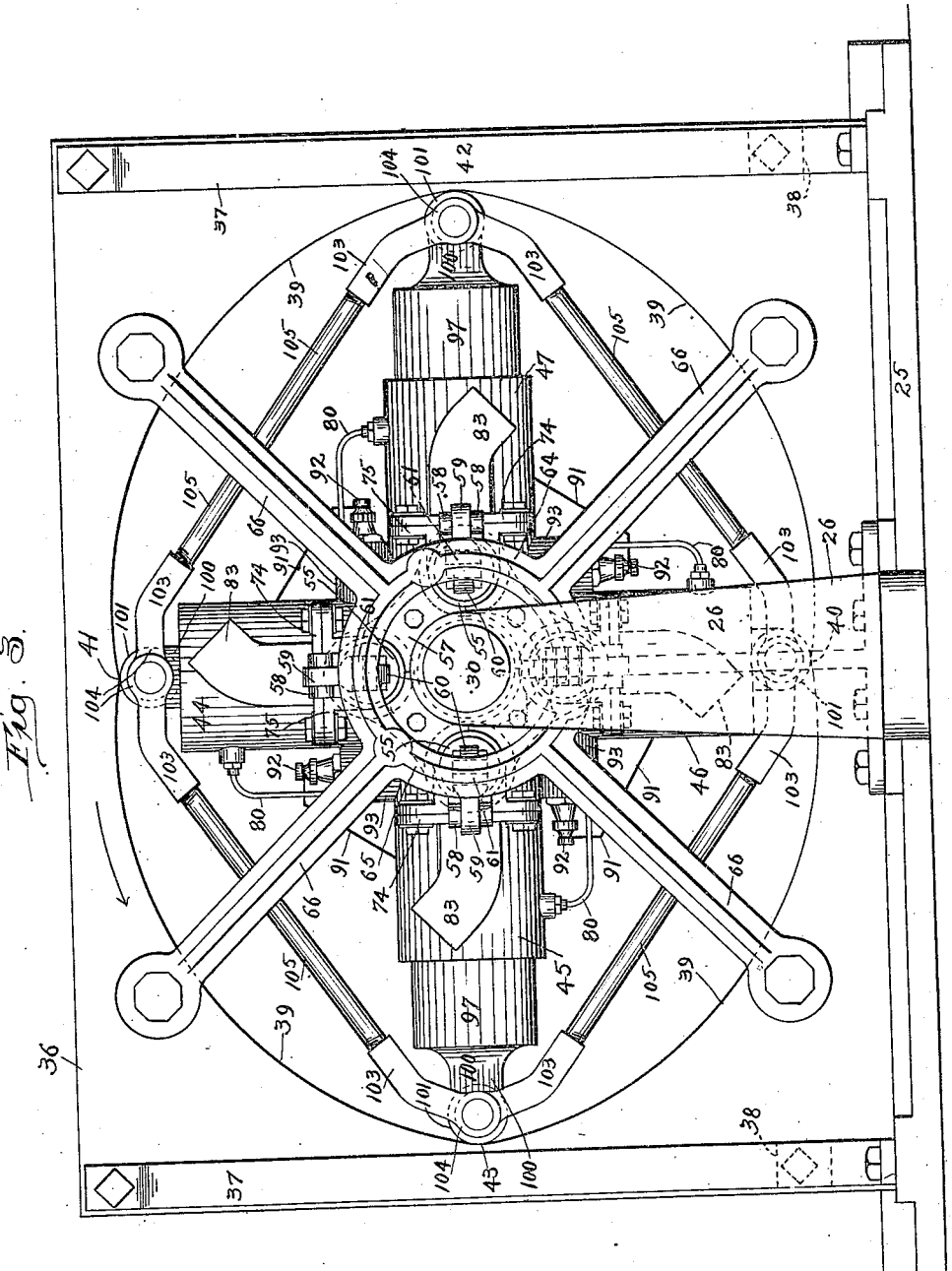

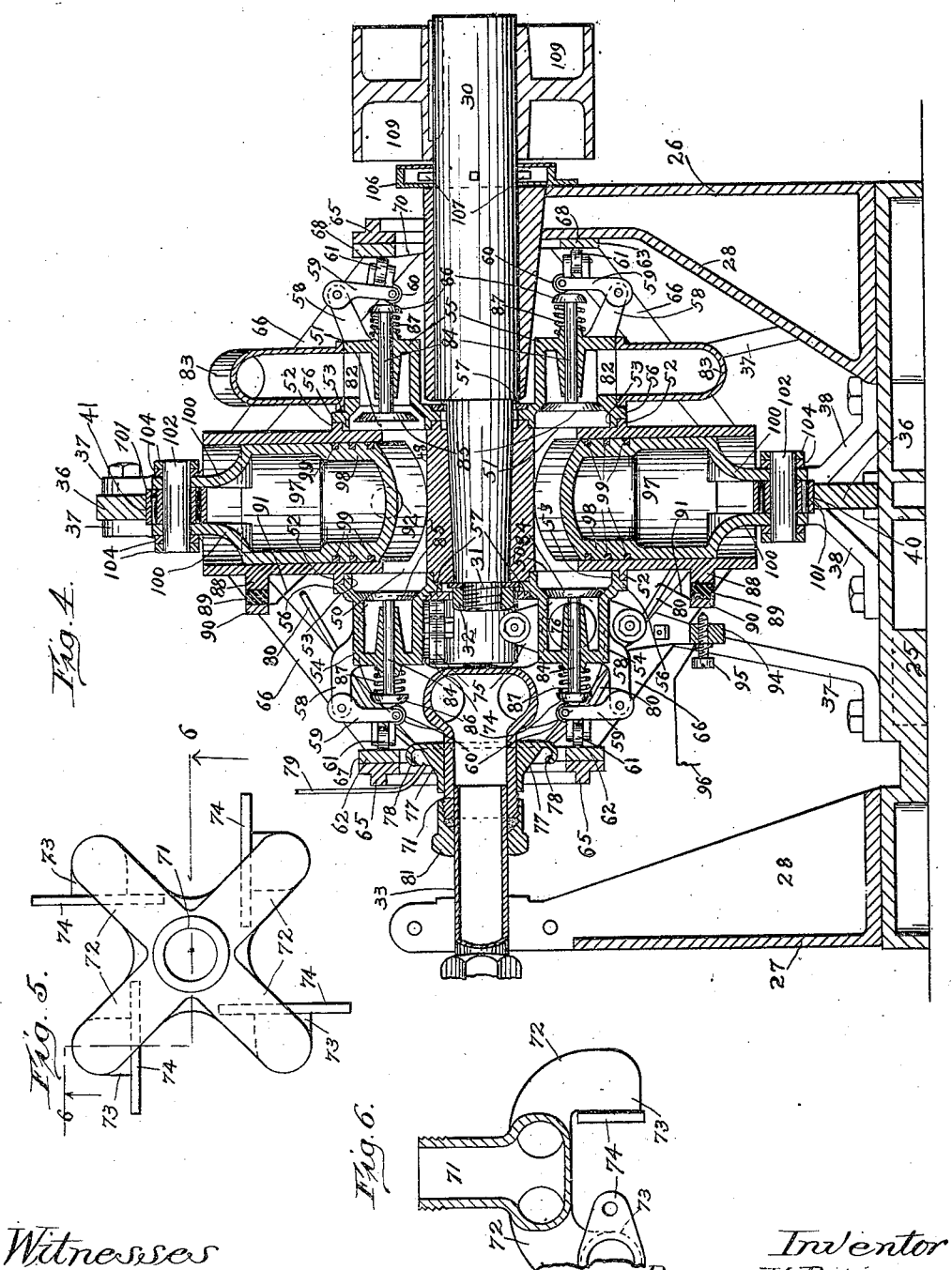

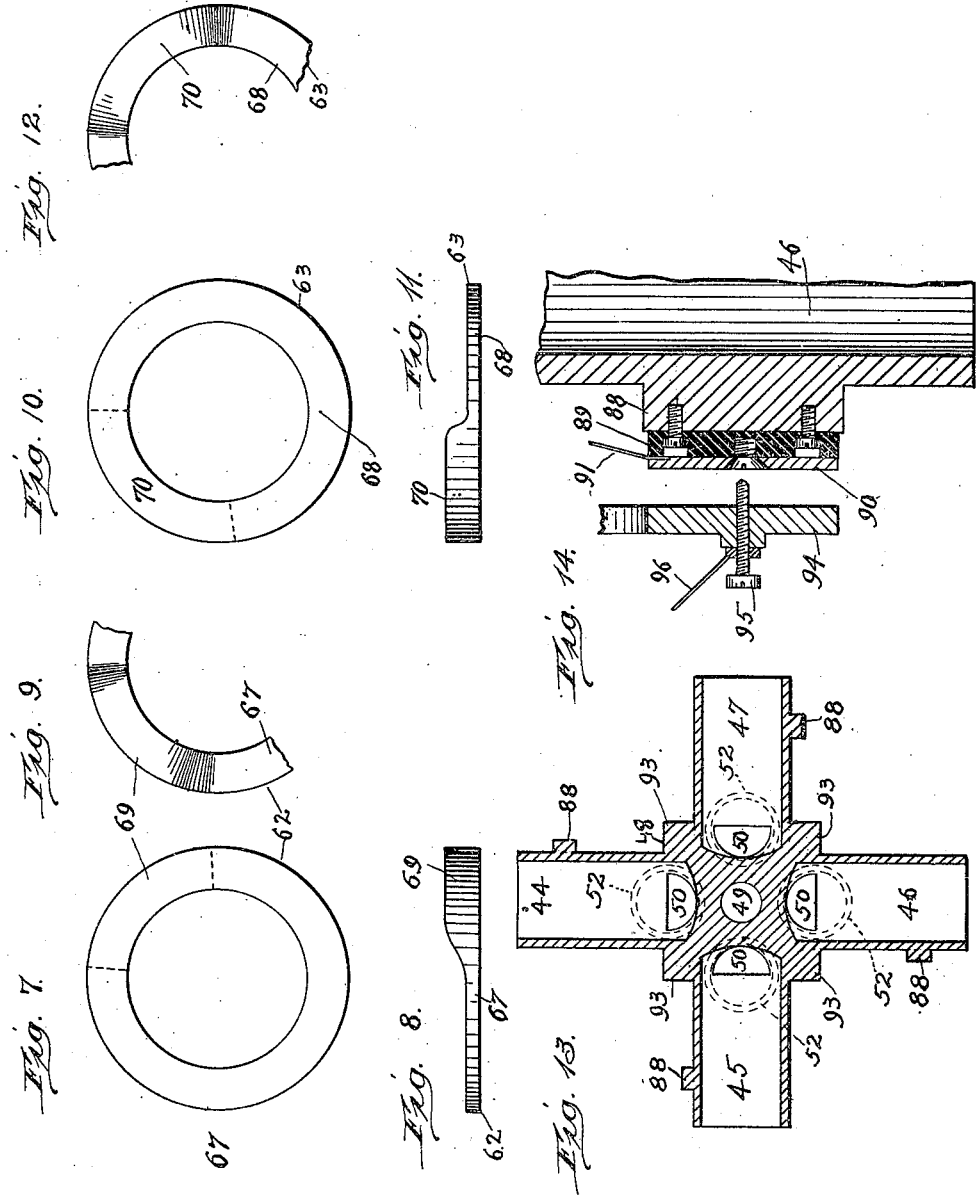

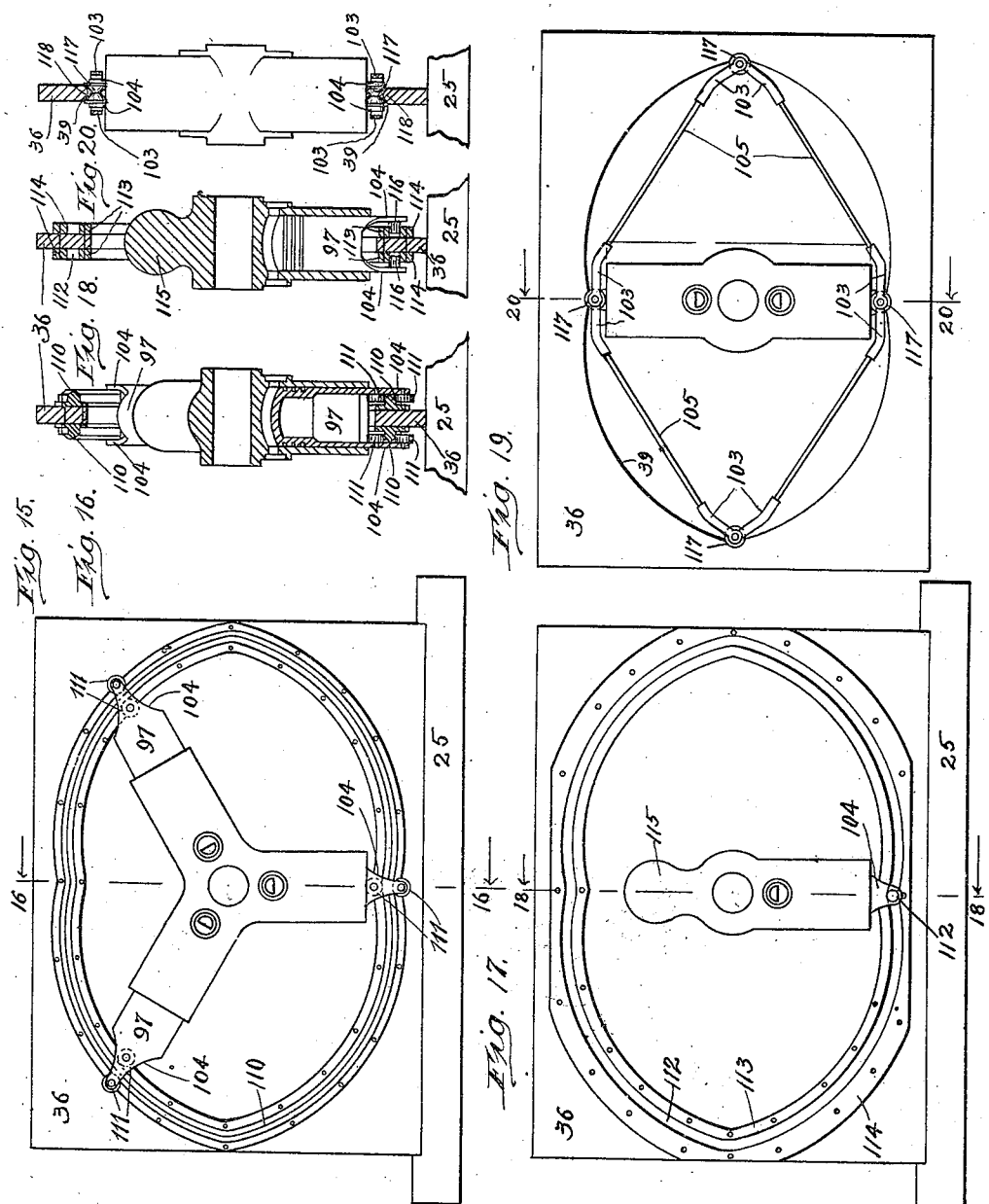

UNITED STATES PATENT OFFICE.

DYCKE H. REIMERS, OF CHICAGO, ILLINOIS.

CRANKLESS ENGINE OR MOTOR.

936,036.

Specification of Letters Patent.   Patented Oct. 5, 1909.

Application filed December 7, 1907. Serial No. 405,608.

*To all whom it may concern:*

Be it known that I, DYCKE H. REIMERS, a citizen of the United States, residing at Chicago, in the county of Cook and State of Illinois, have invented certain new and useful Improvements in Crankless Engines or Motors, of which the following is a specification.

This invention relates to certain new and useful improvements in hydro-carbon engines or motors of the revolving cylinder type, and consists in certain peculiarities of the construction, novel arrangement, and operation of the various parts thereof, as will be hereinafter more fully set forth and specifically claimed.

The principal objects of the invention are to furnish an engine capable of producing the greatest speed with the smallest motor and with minimum expense, which shall be simple and inexpensive in construction, strong, durable, and efficient in operation, self-cooling, automatically lubricating, and so made that its parts may be easily assembled and access thereto readily attained when required for repairs.

Another object of the invention is to provide an engine of such construction that its cylinders will be continuously and thoroughly lubricated and will exhaust into substantially a vacuum, thereby overcoming atmospheric resistance and avoiding the back pressure incident to the use of mufflers and preventing the spark-plugs becoming coated with soot, and fouling of the cylinders, which would render the engine inefficient by reason of the uncertainty of or premature explosions.

Still another important object is to provide means for producing perfectly balanced explosions, and in sequence or consecutively throughout the series of cylinders, thus avoiding jumps as is the case in the type of engines heretofore constructed, thereby attaining uniformity of movement without unnecessary vibration, and conserving and utilizing the full effect of the charges.

Numerous other objects and advantages of the invention will be disclosed in the subjoined description and explanation.

In order to enable others skilled in the art to which my invention pertains, to make and use the same, I will now proceed to describe it, referring to the accompanying drawings, which serve to illustrate the invention, but it will be understood that the mechanism illustrated is only one of many possible embodiments that fall within the scope of this invention.

In the said drawings—Figure 1 is a view in elevation of one end of a complete engine embodying one form of the invention; Fig. 2 is a view in elevation of the feeding or intake side of the engine with the carbureter shown in Fig. 1 omitted; Fig. 3 is a similar view of the opposite side from that shown in Fig. 2 with the power transmitting pulley and commutator omitted; Fig. 4 is a central vertical cross-sectional view of Fig. 1; Fig. 5 is an outer view in elevation of the intake spider showing it detached; Fig. 6 is a view partly in section and partly in elevation thereof taken on line 6—6 of Fig. 5 looking in the direction indicated by the arrows; Fig. 7 is an outer face view of the cam which controls the intake valves; Fig. 8 is an edge view thereof; Fig. 9 is a fragmental view of the inner face thereof; Fig. 10 is an outer face view of the cam which controls the exhaust valves; Fig. 11 is an edge view thereof; Fig. 12 is a fragmental view of the inner surface of the same; Fig. 13 is a central sectional view of one form of the cylinders of the engine; Fig. 14 is an enlarged sectional view of a portion of one of the cylinders and a part of the sparking segment; Fig. 15 is a side view in elevation of a modified form of the cylinders of the engine, illustrating a modification in the construction of the piston-controlling-race; Fig. 16 is a sectional view taken on line 16—16 of Fig. 15 looking in the direction indicated by the arrows; Fig. 17 is a view in side elevation, illustrating another modification in the construction of the engine cylinder, and also in the construction of the piston-controlling-race; Fig. 18 is a cross-sectional view taken on line 18—18 of Fig. 17 looking in the direction indicated by the arrows; Fig. 19 is a view in side elevation illustrating still another modified form of the cylinders of the engine, and another modification in the construction of the piston-controlling-race; and Fig. 20 is a cross-sectional view partly in elevation taken on line 20—20 of Fig. 19 looking in the direction indicated by the arrows.

Like numerals of reference, refer to corresponding parts throughout the different views of the drawings.

The reference numeral 25 designates the bed-plate on which the supporting-frame and piston-controlling race are mounted, and while said bed-plate is shown in a horizontal position and the engine is illustrated and will hereinafter be described as rotating in a vertical plane, yet I do not desire to be limited to such positions of the parts, as the engine may rotate in a horizontal plane and may be suitably supported for such operation.

Mounted at each side of the bed or base-plate 25 and at about its middle are uprights 26 and 27, each of which is preferably provided with a vertical rib 28 for strengthening the same. The upper portion of the upright 26 is formed or provided with a hollow and inwardly projecting extension 29 which forms a bearing for the driven or power transmitting shaft 30, which preferably has a tapered inner portion on which the cylinders are mounted, and a reduced and screw-threaded inner end 31 to receive a nut 32 for holding the cylinders in position on said shaft. The upper portion of the upright 27 has horizontally and rigidly mounted thereon an intake or feed pipe 33 which extends inwardly from the upright 27, as is clearly shown in Fig. 4, and has mounted on its outer portion or communicating therewith a carbureter 34, of the ordinary or any preferred construction, which may have communication through a pipe 35 with a supply of gasolene or other suitable hydro-carbon.

Mounted on the bed-plate and extending longitudinally thereof at about its middle is a piston-controlling race-plate 36, which is supported near each of its ends on each side thereof by means of bars 37 which are bolted at their upper ends to the plate 36 and at their lower ends to the supporting-plate 25 or base. The lower portion of the race-plate 36 is additionally supported by means of braces 38 secured at one of their ends on each side of the lower portion of the plate and at their other ends to the supporting or bed-plate. The piston-controlling race-plate 36 may be made of any suitable size and material and is formed with an opening, which is substantially elliptical in shape, the walls circumscribing which form the race 39 which guides or controls the action of the pistons of the cylinders. By reference to the drawings, and particularly Figs. 2 and 3 thereof, it will be seen that the race 39 is slightly more diametrically contracted as at 40 and 41 midway between its ends, or rather midway between the intersection therewith of a line drawn through its greatest diameter, for instance, from a point indicated at 42 to another point indicated at 43 at the ends of the plate, than the other portions of the race, thus producing slight inward projections 40 and 41 in the race, from which points and on either side thereof the walls will retreat to the points 42 and 43 at the ends of the race. When the plate 36 is secured in position, the inner portion of the rotary or driven shaft 30 will occupy a central position within the race 39, and the cylinders, which are preferably made integral with one another as shown in Fig. 13, may be secured on the shaft 30 in any suitable manner, but by preference, by means of a nut 32 engaging the screw-threaded end 31 of the shaft.

The cylinders 44, 45, 46 and 47, when the engine is of the four-cycle type as shown in Figs. 1 to 4, inclusive, and 13, have integral therewith a central portion or hub 48 which is provided with a central opening 49 to receive a portion of the shaft 30, and each of these cylinders has at its inner end an inlet port 50 and diametrically opposite the same an outlet or exhaust port 51 to be opened and closed by means of suitable valves, as will be presently explained. Around each of the inlet ports 50 and each of the exhaust ports 51 on each of the cylinders is provided or produced an annular flange or boss 52 with which the inner ends 53 of each of the inlet valve-casings 54 and exhaust valve-casings 55 engage. Each of the valve-casings 54 and 55 is provided near its inner end on its outer surface with a flange 56 which rests on the outer ends of the flanges or bosses 52 and are held in place thereon by means of centrally apertured and peripherally recessed plates 57, the shaft 30 being extended through the aperture of said plates and the valve-casings embraced by the peripheral recesses thereof. These plates are bolted or otherwise secured to the hub or central portion of the cylinders so as to clamp the flanges 56 of the valve-casings against the bosses 52, as is apparent. Each of the valve-casings 54 and 55 is provided on its outer portion with an arm 58, to each of which is pivotally secured one end of a lever 59 which has journaled on its other end a small roller 60 to co-act with the valve-stems, and each of said arms has journaled on its outer portion near its free end another roller 61 to co-act with the valve operating cams 62 and 63 which are supported on opposite sides of the cylinders by means of skeleton or spider-like frames, indicated as a whole by the reference numerals 64, see Figs. 2 and 3 of the drawings. Each of these frames has a central circular portion 65, one of which surrounds the shaft 30 and the other the neck of the intake spider or distributer, which is rotatably mounted on the pipe 33 which leads from the carbureter, and each of said circular portions 65 has radiating therefrom a series of arms 66 which are inwardly inclined toward their outer ends and are secured at said ends to the sides of the race-plate 36, thus supporting the central portion 65 of each of said frames at some distance from the outer ends of the inlet and exhaust valves of the cylinders.

Secured to the inner surface of the central portion 65 of the frame 64 on the intake side of the engine cylinders is a cam 67 employed to co-act with the rollers 61 on the levers 59 for controlling the inlet valves. Secured to the inner surface of the central portion 65 of the frame 64 on the exhaust side of the cylinders is a cam 68 used to co-act with the rollers 61 on the levers 59 for operating the exhaust valves. Each of the cams 67 and 68 is made in the form of a flat ring (see Figs. 7 to 12, inclusive) and have about one-quarter of their faces inwardly extended or enlarged as at 69 and 70, respectively, so as to open the valves in the revolution of the cylinders.

Rotatably mounted on the inner portion of the feed-pipe 33 is the intake spider or distributer, which comprises a tubular portion or neck 71 having its outer end externally screw-threaded, and a series of radial pipe sections 72 communicating therewith at one of their ends and having their other ends turned as at 73 and each provided with an apertured flange 74 (see Figs. 5 and 6) to be used for connecting the pipe sections 72 to similar flanges 75 on the inlet valve-casings 54 at the inlet-ports 76 in the walls thereof. Mounted on the neck 71 of the intake spider or distributer is a cone-shaped collar or nut 77 which tapers outwardly and has at its periphery an outwardly turned flange 78 which forms a cup or receptacle around the inner portion of the cone 77 to which oil may be supplied through a pipe 79 leading from a source of oil supply (not shown). Connected to the cone-nut or collar 77 and communicating with the cup or receptacle thereof are a series of small tubes 80 which lead to and communicate at their other ends with the cylinders near the outer ends thereof. Mounted on the feed-pipe 33 and engaging the outer portion of the neck 71 of the intake spider is a stuffing box 81, which will rotate with the spider in the operation of the engine. Each of the exhaust valve-casings 55 is provided with an outlet port 82 and has secured to its walls around said port an exhaust pipe 83 which are inclined or bent at their free ends in a direction opposite to that in which the cylinders rotate, as will be understood by reference to Fig. 3 of the drawings. The inner end of each of the exhaust pipes 83 is provided with a flange 74 similar to that on each of the pipes 72 of the distributer, which flanges are secured to flanges 75 on the exhaust valve-casings 55 at their outlet ports.

Movably located in each of the inlet valve-casings 54 and in each of the exhaust valve-casings 55 is a stem 84 each of which has on its inner end a valve 85 to close their respective ports. On its outer end each of the stems 84 has a head 86 which heads co-act with the rollers 60 on the levers 59 and are held in contact with said rollers by means of springs 87 encircling the outer portions of the stems, and said springs also serve to hold the rollers 61 on said levers in contact with the cams 67 and 68 for the inlet and exhaust valves, respectively.

Each of the cylinders is provided on its intake surface with a lug 88 to which is secured a piece of fiber 89 or other insulating material, on the outer surface of which is secured a metallic piece 90 (see Fig. 14) from which leads an electric conductor 91 to a spark-plug 92 on a boss 93 which communicates with the cylinder near its inner end. Secured at its ends to two of the arms 66 of the skeleton-frame 64 on that side of the engine adjacent to the carbureter is a segment 94 which is insulated from the arms 66, and is so located that it will be near the path of the plates 90 on the cylinders in the revolution thereof. The segment 94 is provided with an adjustable binding-post or screw 95 to which connects one end of a conductor 96 to the segment, the other end of which leads to a spark-coil (not shown). By this arrangement it is evident that the binding-post or screw 95 may be adjusted so as to extend at its inner end near the plates 90 in their revolutions in order to create a jumping spark. As will be seen in Figs. 4 and 13 of the drawings the outer ends of the cylinders are open so that the pistons 97, which are preferably hollow for the purpose of lightness, can be inserted therein and so that their outer ends can protrude through the open ends of the cylinders. Each of the cylinders preferably has a thickened portion 98 near its inner end and is formed around said thickened portion with a series of grooves 99 in which are located packing rings of the ordinary kind. The outer end of each of the pistons 97 is formed or provided with two spaced apart extensions 100 on and between the outer ends of which is journaled a roller-bearing roller 101 the peripheries of each of which extend far enough beyond the outer ends of the extensions 100 to permit them to contact with the race 39 in the race-plate. On the ends of the shaft 102 of each of the rollers 101 are pivotally secured two oppositely extending arms 103, each of which is provided at one of its ends with forks 104 having openings therein to receive the shaft 102 and adapted to stride the projections 100 on the outer ends of the pistons. The other ends of each of the arms 103 are provided with suitably screw-threaded sockets to receive the screw-threaded ends of rods 105 which connect the arms 103 and through them the pistons 97 one with another, so that they will move in perfect synchronization.

Suitably mounted on that side of the supporting-frame on which the rotary shaft 30 is journaled and surrounding said shaft is a commutator 106 of the ordinary or any preferred construction, parts of which co-act in a well-known way with contact points 107 extending radially from said shaft. Leading from the commutator 106 to a source of electricity (not shown) is a conductor 108. Mounted on the shaft 30 near the commutator is a pulley or gear 109 used for transmitting power generated by the engine.

In Figs. 15 and 16 is shown a modification in the construction of the piston-controlling-race and also a modification in the construction of the cylinders which may sometimes be used, and in this modification the race-plate 36 is provided, as in the other construction, with an opening substantially elliptical in form and has on each of its sides bordering said opening a rib or rail 110, which in the present instance, constitute the race, and said ribs or rails describe in outlines a figure substantially the same as that described by the walls of the race 39 shown in Fig. 2 and above set forth. In this modification three instead of four cylinders are employed, and as before, they are preferably made integral, but arranged at obtuse angles with respect to one another and are adapted to be mounted on the rotary shaft 30 so as to rotate therewith. The pistons 97 in this construction have journaled on the inner surface of each of their extensions 104 a pair of spaced-apart rollers 111 which are adapted to impinge against the sides of the rails 110 so as to cause the pistons 97 in the revolution of the cylinders to reciprocate back and forth therein.

In Figs. 17 and 18 is shown still another modification in the construction of the race and motive part of the engine, which consists in providing the race-plate 36 on each of its sides with a groove 112 which describe a figure substantially the same in outlines as that described by the race shown in Fig. 2; and said grooves which constitute the race in this construction are preferably produced by securing two spaced-apart strips 113 and 114 to the sides of the plate 36 at and near the border of the opening therein. In this modification a single cylinder is mounted on the rotary-shaft and is preferably counterbalanced by means of an enlargement 115 produced thereon at its end opposite to that in which the piston operates. The extensions 104 on the pistons 97 in this construction each has journaled on its inner surface a roller 116 to travel in the grooves 112 between the strips 113 and 114 therefor.

In Figs. 19 and 20 is shown still another modification in the construction of the race and cylinders of the engine, in which two cylinders preferably integral with one another are employed to operate in a race substantially the same shape as that shown in Figs. 2 and 3 of the drawings and above-described. In the present modification the cylinders are mounted to rotate with the shaft 30, and each pair of the extensions of the pistons thereof has journaled between the same a grooved roller 117 which co-act with the angularly shaped edge or wall 118 of the race 39 in the race-plate. In this modification a pair of arms 103 of the same form as those used in the construction shown in Figs. 2, 3 and 4 and above-described are pivotally connected to the extensions 104 on the pistons, and the other ends of said arms are connected by means of rods 105 to two pair of arms 103 located diametrically opposite each other and at a sufficient distance from the cylinders to cause the rollers 117, with which each of said pair of the arms is equipped, to contact with and travel on the angular-shaped wall of the race 39 in the race-plate.

From the foregoing and by reference to the drawings it will be clearly understood and readily seen that the cylinder or cylinders of the engine with the various parts thereof may be assembled as above-described, and placed and secured on the inner portion of the shaft 30 and within the piston-controlling-race after the skeleton-frame 64 on the exhaust side of the engine has been secured in place, after which the skeleton-frame 64 on the inlet side of the engine may be secured in position, when by rotating the shaft 30 by any suitable means, it is evident that in the rotation of the cylinders the inlet valves, by reason of their co-action with the enlarged portion 69 of the cam which controls them, will be opened consecutively so as to permit the gas or vapor to pass from the carbureter through the pipe 33 and intake spider into the inlet valve-casings and from thence into the inner portions of the cylinders where the charges will be consecutively exploded by reason of the co-action of the contact plates 90 with the adjustable screw or post 95 on the segment 94, which contact plates in the rotation of the cylinders will pass in close proximity to the ends of the screw or post 95, thus producing jumping sparks in the well-known way. As the cylinders continue to revolve it is evident that the enlarged portion 70 on the cam 68 which controls the exhaust valves 85 will cause said valves to open consecutively and thus permit the burnt products of the charges to pass out through the exhaust valve-casings and exhaust pipes 83, which being deflected at their free ends in a direction opposite to the rotation of the cylinders, will create a vacuum at the rear of the free ends of said pipes, thus causing the unconsumed particles of carbon to be discharged from the cylinders and thereby keeping them in a clean condition and preventing sooting of the spark-plugs. The operation of lubricating the cylinders of the engine is thorough and automatic and is performed by means of the pipe 79, which leads from a supply of oil to the cup-shaped periphery 78 of the cone 77 which is mounted on the neck 71 of the intake spider or distributer and by means of tube 80 which lead from the cup 88 to the cylinders and communicate therewith. As the cylinders rotate at a very high rate of speed it is evident that the oil discharged from the pipe 79 against the cone 77 will be by centrifugal force caused to pass through the tubes 80 into the cylinders, and it is apparent that the surplus oil or lubricant will be discharged therefrom through the outer ends of the cylinders.

In the modifications shown in Figs. 15 to 20, inclusive, practically the same means as above-described for igniting the gas or vapor and for lubricating the cylinders may be employed, and for this reason it is not deemed necessary to enter into a detailed explanation thereof.

By reference to Figs. 2 and 3 of the drawings it will be understood that the cylinders will revolve in the direction indicated by the arrows in said figures and that the operation of charging each cylinder, then compressing the charge, then exploding the same, and then exhausting the charge, will be identical and will take place in sequence or consecutively in the cylinders, for example, just as the roller 101 on the piston of the cylinder 44 approaches the point 41 of the race 39 the inlet valve of said cylinder will begin to open by reason of its co-action with the cam 67 and said cylinder will receive its charge in its passage from the point 41 to the point 43, where the roller 101 of the cylinder 45 is now shown as being located. On its passage from the point 43 of the race to the point 40 thereof the charge in the cylinder 44 will be compressed, and just as it leaves the point 40 in its movement toward the point 42 of the race the explosion of the charge will take place by reason of the arrangement of the sparking appliances, and in this movement from the point 40 to 42 it is evident that the piston will be forced outwardly by reason of the explosion and will climb the wedge-shaped part of the race until it approaches the point 42, when just as it reaches said point, the exhaust-valve for said cylinder will begin to open and the exhaust thereof will take place as the cylinder passes from the point 42 to the point 41 of the race. As before stated, the above-named operation will take place consecutively, and as the pistons are movably united together by means of the arms 103 and 105 it is apparent that they will move in perfect accord or synchronism.

From the above description of my improvements it will be seen that the improved engine or motor constructed according to my invention is of an extremely compact form and of a comparatively simple and inexpensive nature and is especially well adapted for use for propelling automobiles, boats, and other vehicles where compactness and great power is required, and of the fact that it will automatically lubricate its parts and is self-cooling as well as substantially noiseless in its exhaust, and, it will also be evident from the above description that the device is susceptible of considerable modification without material departure from the principles and spirit of the invention, and for this reason I do not desire to be understood as limiting myself to the precise form and arrangement of the several parts of the device as herein set forth in carrying out my invention in practice.

Having thus fully described my invention, what I claim as new, and desire to secure by Letters-Patent, is—

1. A crankless engine consisting of a supporting-frame, a cylinder rotatably mounted thereon, a piston in the cylinder, a cone-shaped collar having a peripheral flange forming a cup and adapted to rotate with the cylinder, a tube to supply oil to the collar and cup, and another tube connected at one of its ends with the cup and at its other end with the cavity of the cylinder.

2. A crankless engine consisting of a plurality of cylinders having their inner ends joined together and mounted to rotate, a reciprocating piston in each of said cylinders; a piston-controlling-race supported around the cylinders and longitudinally thereof, means on the outer portion of each of the pistons to movably engage the race, and connections pivotally uniting the outer portions of the pistons one with the other.

3. A crankless engine consisting of a plurality of cylinders joined together at their inner ends and mounted to rotate, a reciprocating piston in each of said cylinders, a race substantially elliptical in form supported around the cylinders and longitudinally with respect thereto and having slight inward extensions diametrically opposite each other on its smallest diameter, means movably connecting the outer portion of the piston with the race, and connections uniting the outer portions of the pistons with one another.

4. A crankless engine consisting of a plurality of cylinders having their inner portions joined together and rotatably mounted, a reciprocating piston in each of said cylinders, a piston-controlling-race substantially elliptical in form supported around the cylinders and longitudinally with respect thereto and having slight inward extensions diametrically opposite each other on its smallest diameter, anti-friction means movably connecting the outer portion of each of the cylinders with the race, and connections uniting the outer portions of the pistons with each other.

5. A crankless engine consisting of a plurality of cylinders joined together at their inner portions and rotatably mounted, a reciprocating piston in each of said cylinders, a piston-controlling-race supported around the cylinders and longitudinally with respect thereto, means movably connecting the outer portion of each of the pistons with the race, connections uniting the outer portions of the pistons one with another, a cone-shaped collar having a peripheral flange forming a cup and adapted to rotate with the cylinders, a tube to supply oil to the collar and cup, and other tubes communicating at one of their ends with the cup and at their other ends with the cavities of the cylinders.

6. A crankless engine consisting of a supporting-frame, a rotary shaft mounted thereon and extending inwardly of the frame at one of its ends, power transmitting means mounted on the shaft at its outer end, a motive fluid supply-pipe rigidly mounted on the supporting-frame in alinement with the rotary-shaft and having communication at one of its ends with a supply of motive fluid, a plurality of cylinders having their inner portions joined together and mounted on the inner portion of the rotary-shaft to turn therewith, each of said cylinders having an inlet-valve-casing and an outlet-valve-casing, a reciprocating piston in each of the cylinders, a race supported around the cylinders and longitudinally thereof, a roller journaled on the outer portion of each of the pistons to engage the race, connections uniting the outer portions of the pistons with one another, a distributing spider rotatably mounted at its outer portion on the inner portion of the motive supply-pipe and having radial pipes communicating with the inlet-valve-casings and secured thereto, a centrally apertured skeleton-frame secured to each side of the race and surrounding the rotary-shaft and a portion of the distributing spider, a cam secured on the inner surface of the central portion of each of said skeleton-frames, an arm on each of the inlet and exhaust-valve-casings, a lever pivotally secured at one of its ends to each of said arms and each provided with a roller on its free end and another roller on its outer surface, a spring-actuated valve-stem in each of the valve-casings, a valve on the inner portion of each of said stems, said stems adapted to co-act at their outer ends with the rollers at the ends of said levers and the rollers on the outer surfaces of said levers adapted to co-act with the said cams whereby the valves will be opened and closed consecutively in the revolution of the cylinders.

DYCKE H. REIMERS.

Witnesses:
CHAS. E. GORTON,
CHAS. C. TILLMAN.